United States Patent [19]

Leunig

[11] 4,389,228

[45] Jun. 21, 1983

[54] CONSTANT TENSIONING DEVICE

[75] Inventor: Carl V. Leunig, Glenmont, N.Y.

[73] Assignee: Albany International Corp., Menands, N.Y.

[21] Appl. No.: 296,332

[22] Filed: Aug. 26, 1981

[51] Int. Cl.³ .............................................. B01D 46/02
[52] U.S. Cl. ........................................ 55/379; 55/492; 55/508; 242/107; 248/330.1; 248/572
[58] Field of Search .................................. 55/378–379, 55/508, 492; 242/107; 248/572, 330.1, 334.1

[56] References Cited

U.S. PATENT DOCUMENTS

| | | | |
|---|---|---|---|
| 971,013 | 9/1910 | Smith, Jr. | 55/378 |
| 1,295,711 | 2/1919 | Dod | 55/508 X |
| 1,761,377 | 6/1930 | Warning | 55/378 X |
| 2,010,898 | 8/1935 | Ruemelin | 55/379 |
| 2,923,491 | 2/1960 | Fischer et al. | 242/107 |
| 3,812,660 | 5/1974 | Vandenhoeck | 55/378 |
| 4,012,008 | 3/1977 | Hosooka | 242/107 |

Primary Examiner—Kathleen J. Prunner

Attorney, Agent, or Firm—Kane, Dalsimer, Kane, Sullivan and Kurucz

[57] ABSTRACT

A tensioning device is disclosed for maintaining proper tension of a filter bag assembly. The device includes a rotationally mounted cam, a torsion spring urging the cam to rotate in one direction, and a cable trained around the cam opposing the force exerted by the spring. Due to the shape of the cam, the cable force may be exerted at continuously varying distances from the axis of rotation of the cam. The spring, cam, and cable are arranged such that when the spring exerts a relatively high force on the cam, the cable force is exerted a further distance from the axis than when the cam is in a rotational position such that spring force is relatively low. A substantially constant cable force is accordingly exerted. The device is secured between the filter bag and a supporting structure of a baghouse. Constant tension is maintained even if the bag changes in length as the varying spring force is compensated by the cable acting upon the cam at different points.

18 Claims, 5 Drawing Figures

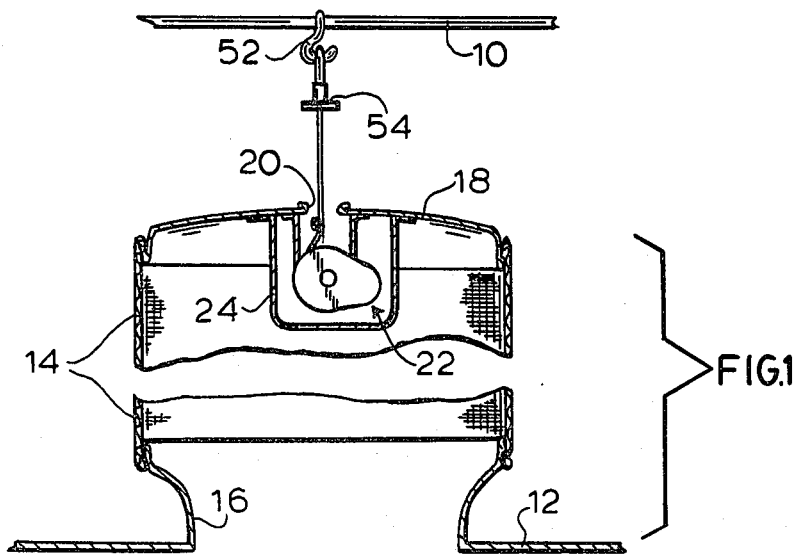
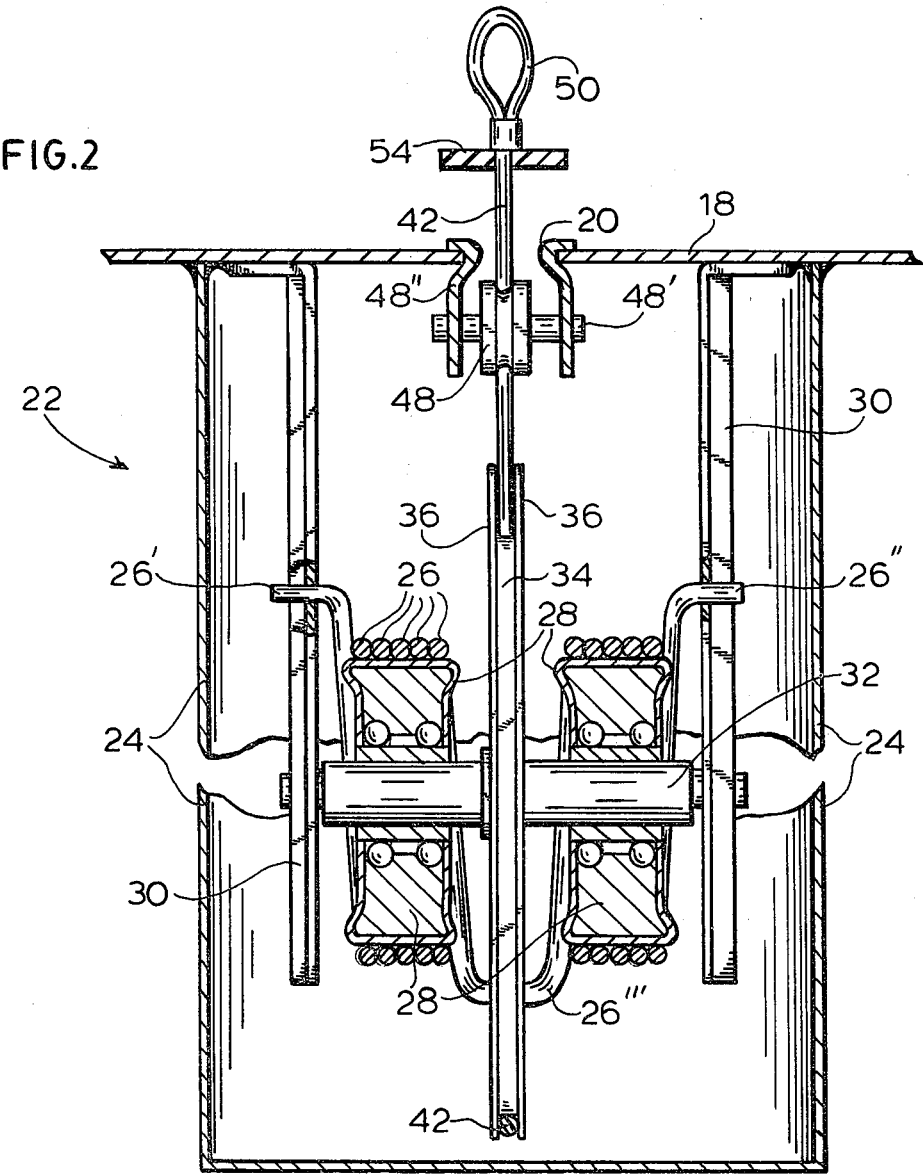

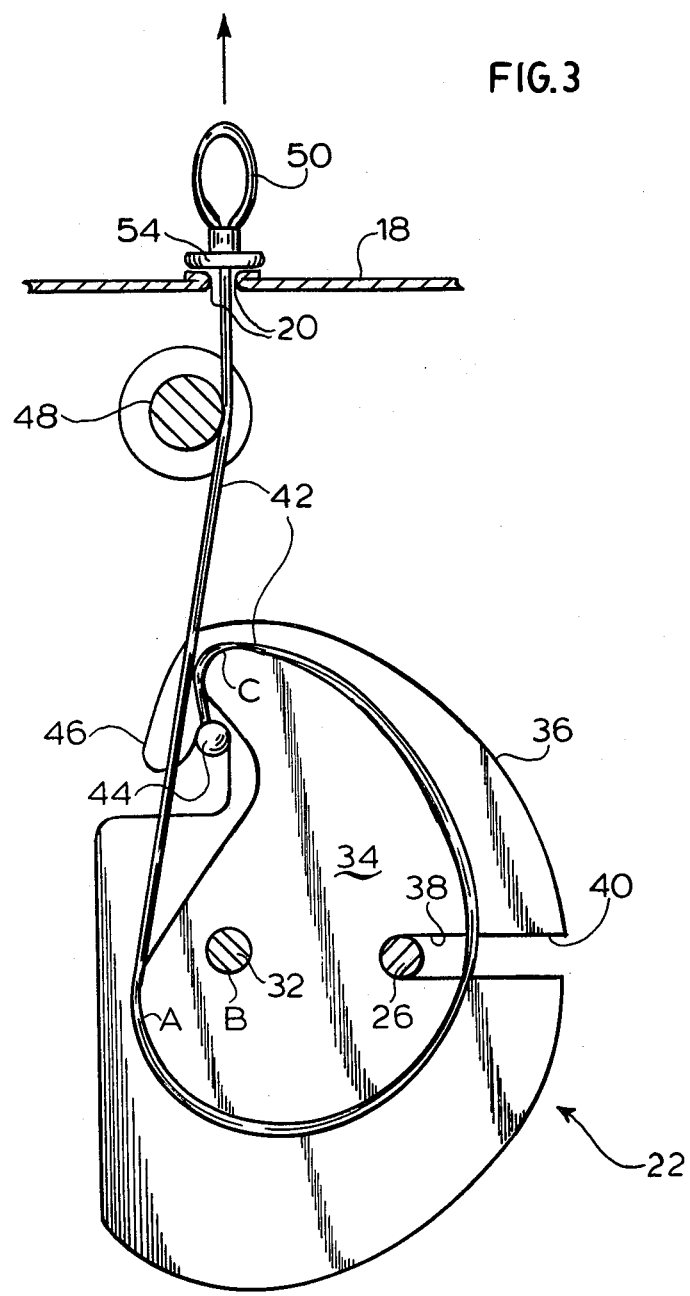

CONSTANT TENSIONING DEVICE

BACKGROUND OF THE INVENTION

The field of the invention relates to tensioning devices, particularly as used in conjunction with filtration apparatus.

It has been found that the performance of reverse-airflow baghouses can be effected when bag tension is either insufficient or excessive. Insufficient tension may result in abrasion, flex failures, and/or potential plugging of the fabric. Excessive tension may cause failures in fixed or anchored areas of the fabric. These problems are more fully explained in an article entitled "Make Fiberglass Filter Bags Last Longer By Maintaining Proper Tension" in the March, 1980 issue of *Power*. Problems are also created by the varying loads applied to the bag during the cleaning cycle and the varying rates of thermal expansion differences between the support structure and the bags.

Current baghouse systems employ a spring tension device where force is a variable due to the linear nature of a tension or compression spring. These tensioning units are externally mounted to the bag cap with the opposite end attached to the baghouse structure by suitable means. Small changes in bag dimension from cleaning or thermal expansion or other causes may result in rapid change in the spring rate with concurrent increases or decreases in bag tension and fiber stress in the bag. Some bags are made of polymeric or similar materials and are subject to the phenomenon known as creep. Creep varies in each polymeric material as a function of temperature and stress. An increase in temperature or fiber stress can cause an increase in bag length with a corresponding decrease in bag tension. Conversely where polymeric materials have had oriented stress imposed upon them during manufacture, shrinkage of the bag could occur, again changing fiber stress on the bag.

It is well known that cyclical application of stress causes fatigue failure. This fatigue failure is accelerated at increased stress levels. Textile materials may also undergo changes in dimension due to fiber straightening or other changes in geometry as a functioning of the load.

Maintaining accurate tension on filter or fume bags is essential to long life and optimum performance. In conventional bag house systems as described above, proper tension may not always be applied. For example, if a conventional spring system has a spring rate of 40 pounds per inch and one desires to set an 80 pound tension, then the spring must be compressed (with a compression spring) or elongated (with a tension spring) two inches to achieve an 80 pound force. A one-quarter inch error in setting the spring will result in a bag tension which is 10 pounds from the optimum. A further and more serious complication exists when a 40 foot high bag house must operate at 500° F. (260° C.). A steel baghouse of this height will expand about 1.7 inches in the transition from 70° F. to 500° F. This expansion would increase the bag tension by 68 pounds, for a total of 148 pounds rather than the 80 pounds desired. Further complications exist since the carbon steel spring will stress relieve about 250° F.

SUMMARY OF THE INVENTION

The invention is directed to an improved tensioning device which recognizes the problems created by the varying loads applied to the bag during the cleaning cycle and the varying rates of thermal expansion differences between the baghouse support structure and the filter bags therein. The invention provides an automatic means of compensating for bag dimensional changes from any cause while at the same time maintaining a constant pre-set tension on the bag or filter media.

The constant tension device according to the invention includes a torsion spring, a cam, and a cable. The cable operates the torsion spring by means of the cam. The force exerted on the cable will be substantially constant for a predetermined range of motion as the changing force of the torsion spring is continuously compensated by a changing fulcrum arm provided by the cam. In other words, as the spring force increases, its force is opposed by the cable acting through a continually increasing fulcrum provided by the cam.

The tensioning device may be employed either within or outside of the bag or attached to the baghouse structure. If used within the bag, a cover is employed to protect it from dust and other particulate matter therein. If used externally, the device may be employed to tension a plurality of bags.

BRIEF DESCRIPTION OF THE DRAWINGS

FIG. 1 is a partially broken sectional side elevation view of a baghouse supporting structure having a bag installed with a constant tension end cap according to the invention;

FIG. 2 is a partially broken sectional elevation view of the front of the apparatus shown in FIG. 1;

FIG. 3 is an enlarged sectional side elevation view of a portion of the apparatus shown in FIG. 1;

DETAILED DESCRIPTION OF THE INVENTION

Figure 4:
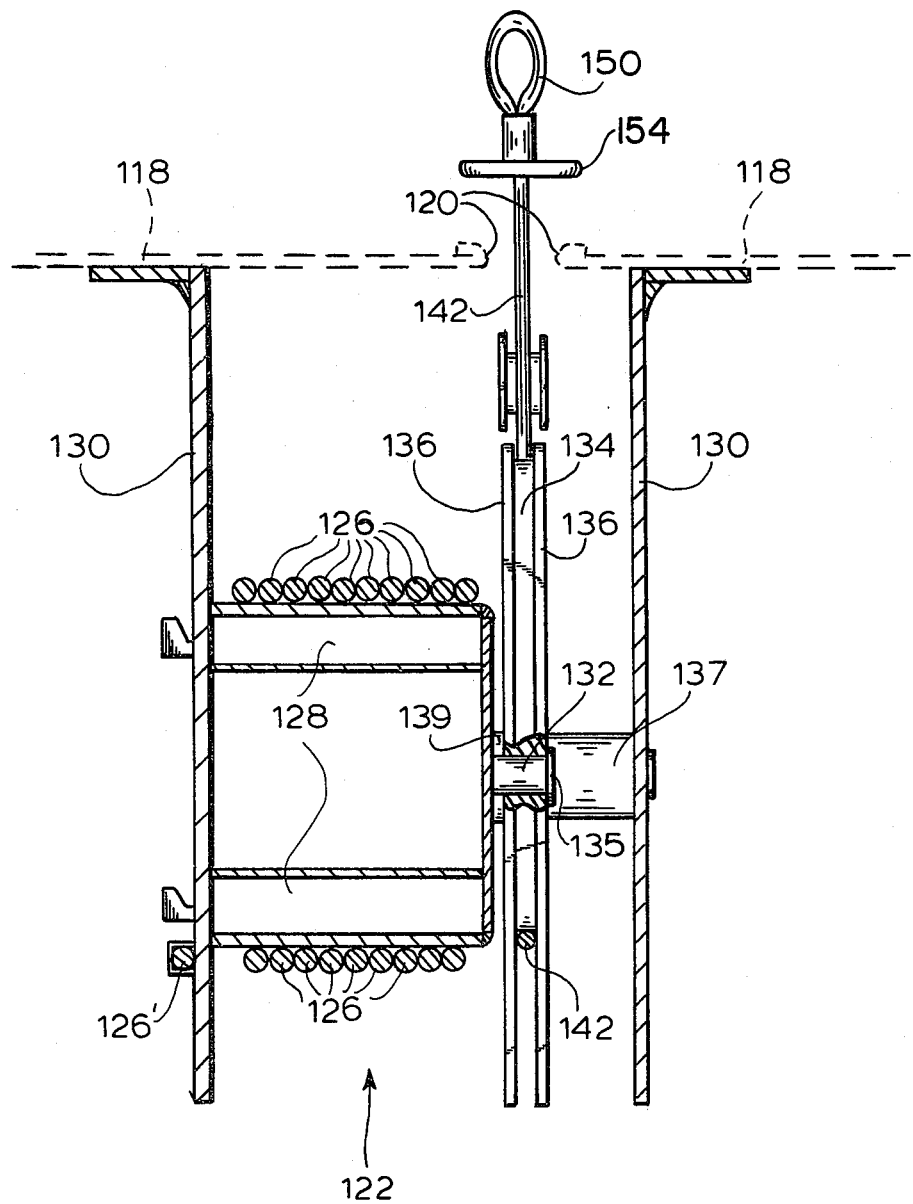
FIG. 4 is a front elevation view of a constant tension device according to a second embodiment of the invention.

The tensioning device according to the invention is designed for applying a constant load to a cable assembly. This is accomplished by using a torsion spring (or other torsion member) whose linearly increasing force is offset by a linearly changing fulcrum arm as measured between the tangent point from where the cable exerts a force upon the cam and the axis of rotation of the cam.

Referring to FIGS. 1-3, a first embodiment of the invention is shown in conjunction with a baghouse supporting structure. The structure includes an upper support member 10 and a lower support member 12. A filter bag 14 of generally tubular configuration is supported between the support members. The lower end of the bag 14 is fixedly secured to the lower support member 12 by a bag securing means 16. The upper end of the bag 14 includes a substantially rigid bag cap 18 having a central aperture 20.

A tensioning device 22 is positioned within the filter bag 14 and is protected from dust and other contaminants by a substantially impermeable cover 24. The cover 24 may be welded to the bag cap 18 or fastened by other suitable means.

The tensioning device includes a chrome-carbon steel, stainless steel or other high temperature torsion spring 26 supported by mandrels 28. The spring in this embodiment is a double torsion spring having a diameter of approximately 2.25 inches with a wire diameter of 0.148 inches. It is designed for applying between seventy-five and eighty pounds of tension to a filter bag. A frame 30 is welded to the bag cap 18. Two opposing ends 26', 26" of the spring 26 are in retaining contact with the frame.

An axle 32 is rotatably mounted along the longitudinal axis of the mandrel 28 and is rotatably supported by the frame 30. Each half of the spring 26 is supported by one rotatable mandrel 28 which is mounted to the axle 32. The mandrels each include bearings which allow them to move as the spring moves. They accordingly resemble skate wheels. A cam 34 having a continuous smooth surface is mounted to the center of the axle 32 such that it is rotatable therewith. The cam is affixed between a pair of cover plates 36 having larger dimensions than the cam. FIG. 3 most clearly illustrates the relationship between these elements. Both the cam and cover plates include slots 38, 40, respectively. The slots extend radially from the axis of rotation of the cam and are aligned with each other. The central portion 26''' of the torsion spring extends through the slot so that it may be operated by the cam.

A cable 42 having a ball fastening 44 at one end thereof is trained about the cam. The cover plates 36 retain the cable in its position on the cam. Each cover plate has a hook-shaped portion 46 in which the ball fastening 44 is locked. A grooved idler pulley 48 is employed for guiding the cable through the opening in the bag cap. The pulley is rotatable about a supporting axle 48' which is in turn mounted to a frame 48". The frame 48" is secured to the bag cap 18. The pulley insures that the cable will be subject to minimal frictional wear due to contact with the bag cap walls regardless of the position of the cam. The end of the cable opposite from the ball fastening is formed into a loop 50. The loop may be secured to a hook 52 or other retaining means on the upper supporting structure 10. A stop 54 is secured to the cable near the loop to prevent it from moving too far within the bag cap 18.

The operation of the device shown in FIGS. 1–3 will now be described. Assuming the torsion spring has a spring rate of 0–160 inch-pounds for a 360° rotation, the apparatus is preloaded one quarter revolution as shown in FIG. 3. The spring at this point is opposing rotation with a force of 40 inch-pounds. Since the point A of tangency of the cable is 0.500 inches from the axis B of revolution of the cam, the force exerted on the loop 50 is 80 pounds. At this initial point, the stop 54 rests upon the bag cap 18. Complete rotation to the 360° tangency point C results in a spring force of 160 pounds applied through a two inch fulcrum. The resulting force on the loop is accordingly 80 pounds. The distance between the axis of rotation of the cam and the tangency points continuously increases between points A and C in proportion to the increasing spring force. A substantially constant filter bag tension is accordingly maintained due to the force exerted by the frame 30 on the bag cap 18. The traverse of the cable using the cam shown in FIGS. 1–3 equals the distance along the cam surface between points A and C. A distance of six inches has been found to be adequate for some applications. It will be appreciated that various cam arrangements may be employed to obtain various travel lengths and various springs may be employed to achieve different tensions. If desired, the apparatus may be designed to unwind more than 360° by the use of a "barrel" or continuous cam surface.

When the filter bag 14 including the constant tension end cap is mounted to the baghouse support structures as shown in FIG. 1, the stop 54 is located well above the bag cap 18. As the bag elongates, the cap 18 moves closer to the stop 54. Despite the elongation, the device 22 insures that the bag 14 remains under a substantially constant predetermined tension. Conversely, where polymeric materials have had oriented stress imposed upon them during manufacture, potential shrinkage of the bag will not result in a change of tension. If elongation is such that the stop eventually rests upon the bag cap 18, the device 22 should be readjusted.

Figure 5:
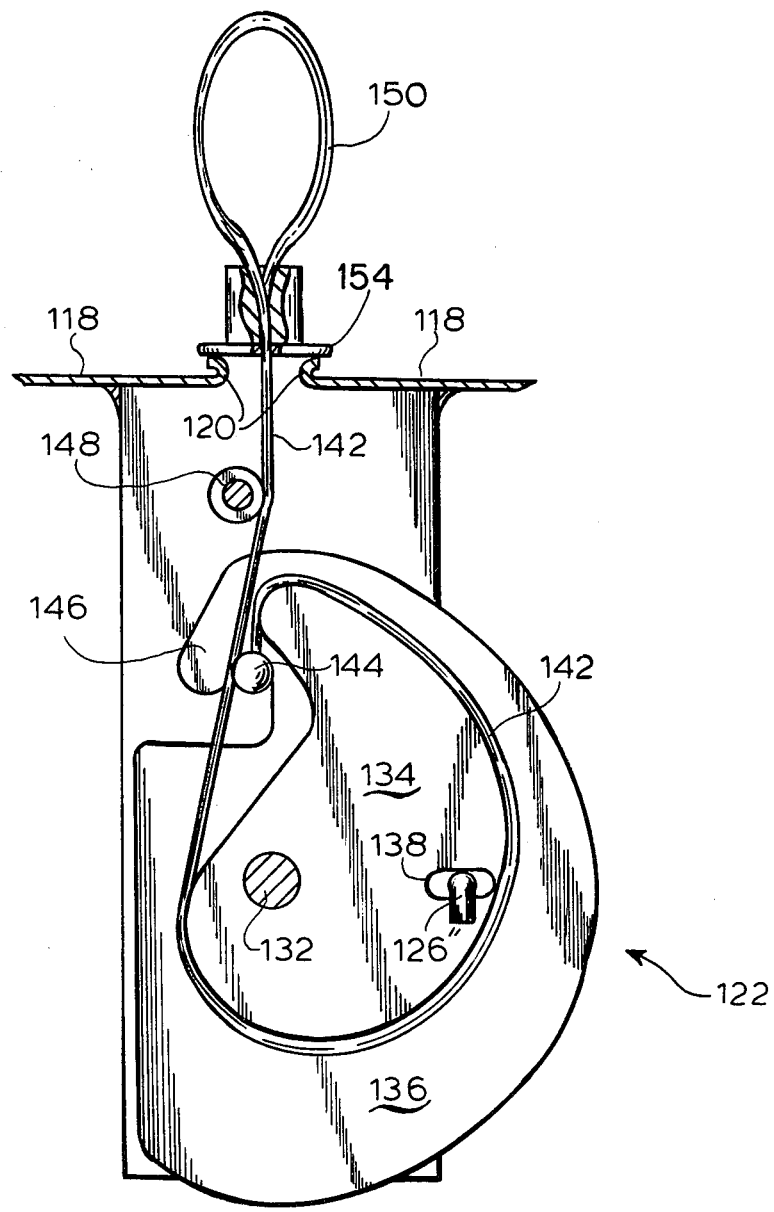
FIG. 5 is an enlarged sectional side elevation view of a portion of the apparatus shown in FIG. 4.

FIGS. 4–5 illustrate a second embodiment of the invention which operates according to similar principles as the first. It includes a tensioning device 122 secured to a bag cap 118 by means of a frame 130 welded thereto. The cap 118 includes a central aperture 120.

A "sidewinder" type torsion spring 126 is employed and is supported by a fixed mandrel 128. Alternatively, a rolling mandrel as shown in FIGS. 1–3 could be employed. Both the spring 126 and the mandrel 128 are attached to the frame 130. One end 126' of the spring projects through and is retained within a suitable opening in the mandrel.

A cam 134 mounted between parallel cover plates 136 is rotatably mounted to an axle 132. The axle 132 is rotatably mounted between opposing frame portions 130. A bushing 135 is used to accommodate the end of the axle 132 extending within the spacer stud 137. The other end of the axle projects through a washer 139 positioned between the mandrel and one of the cover plates 136. The axle is prevented from moving axially by conventional means.

A slot 138 extends through the cam-cover plate assembly for receiving a hook-shaped end portion 126" of the torsion spring. A cable 142 is trained around the cam 134 and extends through the central opening 120 in the bag cap 118. One end of the cam includes a ball fastening 144 which is retained by appropriately sized hook-shaped portions 146 of the cover plates 136. An idler pulley 148 is employed for aligning the cable 142 through the bag cap opening. The end of the cable is formed into a loop 150 so that it may be secured to a hook or other conventional bag retaining means within a baghouse. A stop 154 is secured to the cable beneath the loop to prevent the cable from being pulled too far within the filter bag.

The tensioning device shown in FIGS. 4–5 operates in substantially the same manner as the embodiment shown in FIGS. 1–3. It may either be mounted within the filter bag as shown or outside the bag. If mounted outside the bag, it may be arranged for tensioning one or more bags.

It will be appreciated that the invention provides many advantages over conventional filter bag supporting and tensioning structures. These advantages include: (1) no guess work on installation as to the proper tension as a setting anywhere within the range of operation of the device will be satisfactory; (2) no frequent retensioning with attendant costs; (3) longer baglife due to less mechanical flex damage; (4) higher utilization of baghouse capacity; (5) up to a 5% increase in filtration area; (6) better cleaning; (7) reduced creep of bag and more uniform filtration; (8) compensation for thermal expansion up or down; (9) less corrosion attack since the baghouse does not have to be shut down; shutting down causes a baghouse to pass through the dew point causing acid formation.

The tensioning devices according to the invention may be used for tensioning fabrics and filter bags of various configurations in addition to those shown and described herein.

What is claimed is:

1. A filter bag assembly comprising:
a filter bag;
means connected to said filter bag for maintaining it under substantially constant tension, said means including a rotatably mounted cam having an axis of rotation, a cable at least partially trained around a surface of said can, and spring means urging said cam to rotate in a first direction; said spring means exerting a varying spring force dependent upon the rotational position of the cam, said cable arranged with respect to said cam so that when the cam is in a first rotational position where the spring force is relatively high, the cable is tangent to the surface of said cam at a first distance from the axis of rotation of said cam, and when the cam is in a second rotational position where the spring force is relatively low, the cable is tangent to the surface of said cam at a second distance from the axis of rotation of said cam which is smaller than said first distance.

2. An assembly as described in claim 1 wherein said cable exerts a force on the cam to balance the spring force, and wherein the cable is trained on said cam surface, said surface being continuous, the distance between said surface and the axis of rotation of the cam increasing continuously in one direction such that the force is substantially constant regardless of the rotational position of said cam.

3. An assembly as described in claim 1 or 2 wherein one end of said cable is connected to a supporting structure and a second end of said cable is affixed to a portion of the cam which is not on the cam's axis of rotation whereby the cable urges the cam to rotate in a second direction which is opposite to said first direction.

4. An assembly as described in claim 1 or 2 wherein said spring means is a torsion spring connected to said cam.

5. An assembly as described in claim 4 wherein said torsion spring is a substantially symmetrical double torsion spring having a central portion thereof engaged to said cam.

6. An assembly as described in claim 1 or 2 wherein said filter bag includes a bag cap, said means for maintaining said filter bag under substantially constant tension including a frame secured to said bag cap, an axle supported by said frame, said cam being mounted for rotation about said axle.

7. An assembly as described in claim 6 wherein said bag cap includes an opening therein, said cable extending through said opening.

8. An assembly as described in claim 7 further including an idler pulley affixed to said bag cap, said cable being aligned by said idler pulley and passing through the opening in a substantially friction-free manner.

9. An assembly as described in claim 7 wherein said cable includes a stop thereon which is larger than said opening for preventing its movement into the opening beyond a desired point.

10. An assembly as described in claim 6 further including a cover within which said means for maintaining said filter bag under constant tension is located, said cover being attached to said bag cap.

11. An assembly as described in claim 1 or 2 wherein said cam is mounted between a pair of cover plates, said plates extending beyond said surface of said cam upon which said cable is trained.

12. An assembly as defined in claim 11 wherein each of said cover plates includes a hook-shaped portion, said cable includes an enlarged fastening member at one end thereof, said fastening member being engaged by said hook-shaped portions.

13. A filter bag assembly comprising:
a filter bag having a first end including a bag cap and an opposing second end, said bag cap having an opening therein;
a first support structure;
a second support structure;
means for securing said second end of said filter bag to said second support structure;
a frame secured to said bag cap and extending within said filter bag;
a cam rotatably mounted to said frame;
a torsion spring contected to said cam and said frame, said torsion spring urging said cam to rotate in a first direction providing a variable force dependent upon the rotational position of said cam; and
a cable trained around said cam, one end of said cable extending through said opening in said bag cap and being secured to said first support structure, a second end of said cable being secured to the cam, said cable exerting a force upon said cam opposing the force exerted thereon by said torsion spring, said cam, cable, and torsion spring being arranged such that said filter bag is maintained under substantially constant tension even if it shrinks or elongates a predetermined amount.

14. An assembly as described in claim 13 further including an idler pulley mounted to said bag cap, so that said cable contacts said pulley such that it is aligned with said opening within said bag cap.

15. An assembly as described in claim 13 or 14 wherein said cable includes a stop thereon outside said filter bag, said stop having larger dimensions than said opening.

16. An assembly as described in claim 13 or 14 wherein said cam is mounted to an axle, said axle being rotatably mounted to said frame.

17. An assembly as described in claim 16 wherein said torsion spring is supported by a mandrel, said mandrel being rotatably mounted to said axle.

18. An assembly as described in claim 13 wherein said torsion spring is supported by a mandrel, said mandrel being mounted to said frame.

* * * * *